July 30, 1929.  H. KLAUCKE  1,722,581
DRIVING CHAIN CASING
Filed Sept. 15, 1926  2 Sheets-Sheet 2

Inventor
Hermann Klaucke
By attorneys

Patented July 30, 1929.

1,722,581

UNITED STATES PATENT OFFICE.

HERMANN KLAUCKE, OF WORCESTER, MASSACHUSETTS, ASSIGNOR TO BALDWIN CHAIN & MFG. CO., OF AUBURN, MASSACHUSETTS, A CORPORATION OF MASSACHUSETTS.

DRIVING-CHAIN CASING.

Application filed September 15, 1926. Serial No. 135,652.

This invention relates to a casing for a driving chain.

The principal objects of the invention are to provide a construction of casing which will be oil-proof throughout; to provide it with a joint between the casing and its cover which will shed the oil inwardly away from the joints at each place where two parts come together; to provide an effective seal around the driving and the driven shafts; to provide an adjustable arrangement whereby the distance between these shafts can be varied without decreasing the effectiveness of the seal or performing any complicated operation; and to provide a hinge construction between the casing and its cover whereby leakage between the same will be prevented and the oil, when it gets as high as the joint, will be directed back into the bottom of the casing. Other objects and advantages of the invention will appear hereinafter.

Reference is to be had to the accompanying drawings, in which

Figure 1:
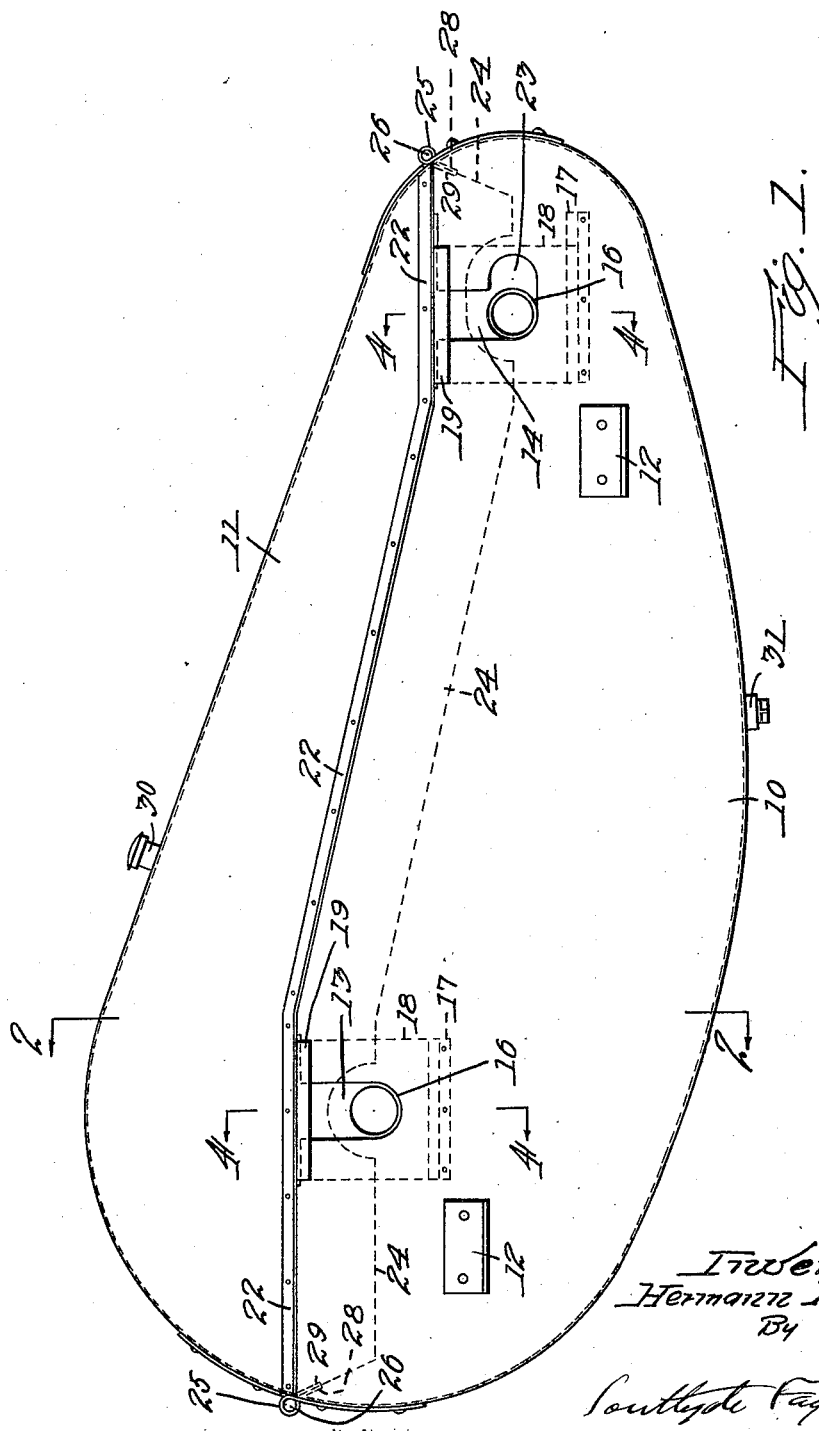
Fig. 1 is a side view of a casing for a driving chain constructed in accordance with this invention.
Figure 2:
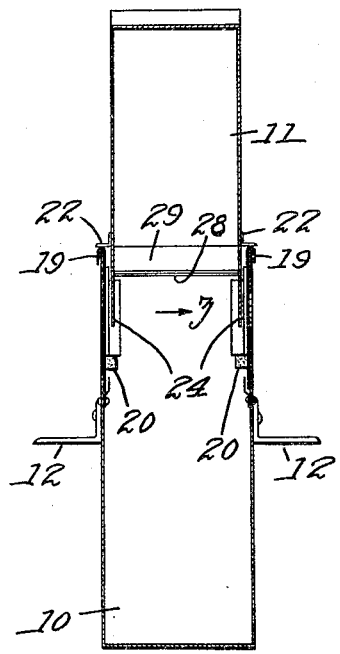
Fig. 2 is a transverse sectional view on the line 2—2 of Fig. 1.

Sprocket drive chains for various types of machinery are protected now by casings of several kinds which usually have the fault that, while they prevent the splashing of oil around the adjacent parts of the building, yet they do not prevent the dripping of the oil from the joints of the casing between the casing and cover where the shafts have to pass through the casing. They are inconvenient to put up and especially inconvenient to open and close again. They do not provide for any adjustment in the distance between the shafts so that each one has to be made for the particular drive and no change can be made in it. Other disadvantages are present in the usual constructions and this invention is designed to overcome such disadvantages.

The casing is shown as comprising a lower part or container 10 and a cover 11. As a general thing the lower part is fixed in position as by means of brackets 12 to which it is secured. But there are cases where the chain is used at the top of a room in which it is the cover that is fixed in position. This invention is equally applicable in either case without changing the parts except to put the brackets on in a different place.

This casing 10 is provided with two vertical slots 13 and 14 for receiving the driving shaft and the driven shaft therethrough. On the inside of the casing there is a track or cleat 17 arranged horizontally riveted to the casing below the opening 13 or 14 as the case may be and spaced from the inside of the casing at the top to provide a track or guide for a sheet metal shield 18. This shield extends up to the top of the casing 10 and has a U-shaped projection 19 overlapping its upper edge. These two parts 17 and 19 constitute guides or tracks on which this shield 18 is adapted to slide horizontally in the form shown.

Figure 3:
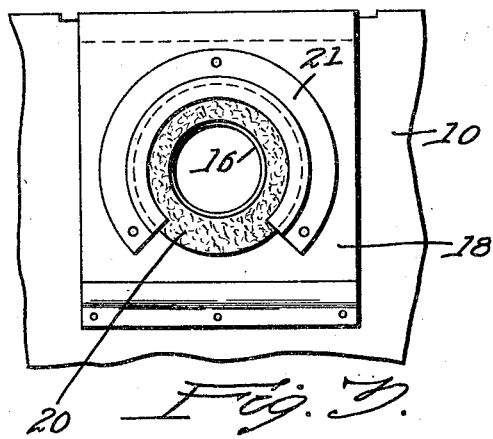
Fig. 3 is an inside view of the means for protecting one of the shafts from the leakage of oil.

The plate or shield 18 has a round opening 16 through it fitting the shaft loosely and inside this opening is a washer 20 of felt or other suitable material practically fitting the shaft and serving to prevent the passage of oil out through the opening. This is held in place by a bronze retainer 21. This retainer is riveted to the shield 18 and is curved more than half way as shown in Fig. 3 to keep the washer in position at all times. This constitutes a seal to prevent the oil from getting out around the shaft. Both ends of each shaft are protected in this way.

At the top the wall of the cover 11 comes down to a position around the retainer 21 and has an angle iron 22 extending along its side which rests on the top of the hook 19 of the shield 18 to seal it at that point and also of course, on top of the wall of the casing 10 at other points.

Figure 4:
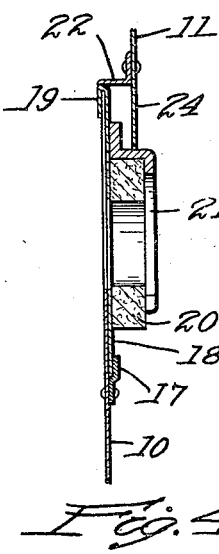
Fig. 4 is a sectional view on either one of the lines 4—4 of Fig. 1.
Figures 5, 6:
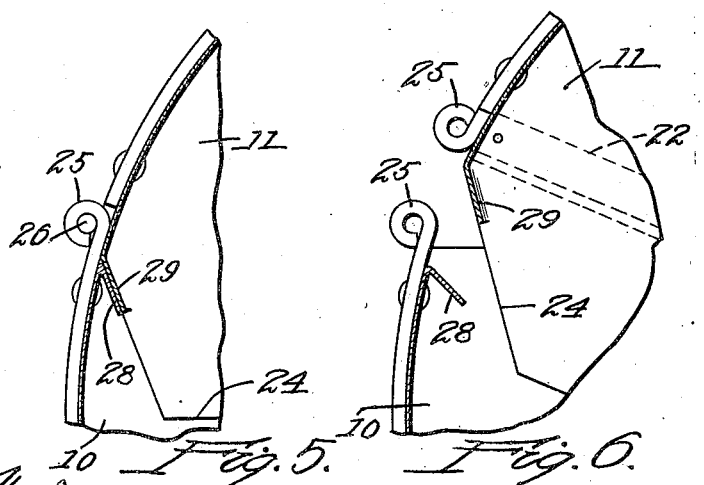
Fig. 5 is a sectional view of the joint between the casing and cover showing the cover closed.
Fig. 6 is a similar view showing the cover raised.

It will be seen that, aside from the oil seal effected by the washer 20, this constitutes practically a shingle seal at other points. Oil splashing up on the inner side of the cover 11, as shown in Fig. 4, will drain down the flange 24 and be diverted around the retainer 21 and at other points will necessarily drip off of the bottom of the flange 24 of the cover 11 at points within the casing 10, so that it will not touch the casing. Also any oil creeping up through the spaces between the retainer 21 and the cover will encounter the shield 18 and be forced to drain down past any opening in the casing 10 before it can be discharged, and then it must drip into the bottom of the casing.

The above description applies to all four of the openings for the two shafts, but the shields 18 for the driving power shaft are provided with an L-shaped slot 23 to permit of adjustment of this shaft longitudinally. Likewise the flange 24 on the cover is cut out here to accommodate the adjustment as it is cut out to accommodate the retainer 21 at the other end. These shields are moved along until the proper adjustment is secured and they are free from the danger of distributing oil outside in spite of their adjustability.

The cover is hinged to the casing below by hinge hooks 25 on both and at both ends. These are connected by tapered pins 26 passing through the hooks. Therefore either pin can be withdrawn and the other pin will act as a hinge and if both pins are withdrawn the cover can be raised vertically. In cases where the cover is fixed, the lower casing can be removed vertically downward. It will be seen that the curved end walls of the casing 10 and cover 11 are provided with flanges 28 and 29 respectively. These flanges are bent inwardly from the metal and so shaped that when the parts are brought together for putting in the hinge pin they will exert a pressure on each other. The flange 29 on the cover is welded to the casing at the ends so as to form a fixed flange, but the flange 28 is left free at its two ends so that it can be forced inwardly by the pressure of the fixed flange, and will thus form a tight joint. Any oil thrown against the cover will drip down the projecting surface formed by the flange 29 and be drained into the casing. There is no force tending to cause even a small amount of oil to ooze out of the space at the hinge joint. The casing is filled with oil through an inlet 30 and the oil can be drained off through an outlet 31.

This constitutes a combined casing and cover which is sealed at all points and under all conditions, which allows for adjustability of the length of the drive and allows for the mounting of the cover in stationary position instead of the lower part of the casing, and provides for the sealing of the joints in spite of the changes and adjustments of which it is capable. The joints are of such a nature that they drain the oil positively in the bottom of the casing and do not provide any means by which it can be discharged outside the casing.

Although I have illustrated and described only a single form of the invention I am aware of the fact that changes can be made therein by any person skilled in the art without departing from the scope of the invention as expressed in the claims.

Therefore, I do not wish to be limited to the exact form shown, but what I do claim is:—

1. In a sealing device for a sprocket drive casing, the combination with the casing or receptacle having a side wall provided with an opening therethrough, of a guide secured to the wall of the casing along the inside below said opening and spaced from the wall to form a space and a horizontal track, a shield extending downwardly into said space, supported and adapted to slide horizontally in said track, and extending up over the top of the side wall and bent over outwardly around the top, said shield having an opening therethrough for the shaft, a washer adapted to prevent passage of oil through the opening, and a retainer to hold it in position.

2. In a sealing device for a sprocket drive casing, the combination with the casing or receptacle having a cover and bottom, the wall of the latter having an opening entirely contained therein, of a guide secured to the wall of the bottom along the inside below said opening and spaced from the wall to form a space and track, a shield extending downwardly into said space, supported and adapted to slide in said track, and extending up over the top of the side wall of said bottom and bent over outwardly around the top, said shield having an opening therethrough for the shaft, a felt washer located on the inside of said shield and adapted to engage the shaft and prevent passage of oil through the opening, and a retainer extending part way around the washer to hold said washer in position, said retainer being mounted on the shield.

3. In a sprocket chain casing, the combination of two parts fitting together and forming the casing, the upper part having its vertical walls extending down directly inside the walls of the lower part and spaced there from the upper part having a supporting flange projecting outwardly therefrom and resting on the top of the lower part of the casing, a slidable shield having an opening therethrough, a washer carried by the shield on the inner side surrounding the opening, and a retainer fixed to the shield for holding the washer in position, the lower edges of the top part being spaced inwardly far enough to allow the oil to drain from said retainer into the bottom of the casing.

4. In a casing for a drive chain, the combination with a bottom and a cover therefor, said cover having flanges at a distance above its bottom extending outwardly and resting on the top of the bottom part of the casing, the bottom having slots therethrough extending down from the top for shafts and a shield for each opening, the openings behind one pair of shields being of L-shape for the purpose described.

5. In an oil case for a drive chain, the combination with the bottom and the top, of a hinge therefor comprising hooks extending alternately from the bottom and top, a tapered pin extending through said hooks and removable so as to entirely detach the cover and top at that point or serve as a hinge if attached, and a pair of flanges on the cover and bottom respectively extending in at an angle so that when the cover and bottom are brought together, the flanges will press against each other and extend downwardly in the casing for discharging the drip into the bottom thereof.

6. In an oil case for a sprocket chain, the combination with a bottom and cover of sheet metal, the bottom having an inwardly and downwardly extending flange along one end and free from the bottom at the sides, the cover having a downwardly extending flange along the end fixed to the cover at the sides, and a hinge located in such position that when the cover is closed the free flange will press against the fixed flange and form an oil seal.

7. In an oil casing for a sprocket chain, the combination with a casing or tank, and a cover therefor, of hinge hooks on the casing and cover at both ends and tapering hinge pins for connecting them together horizontally which can be pulled out by themselves individually at either end to enable the cover to be swung upwardly from either end and whereby either the cover or bottom can be removed from the other in a vertical direction.

In testimony whereof I have hereunto affixed my signature.

HERMANN KLAUCKE.